No. 729,568. PATENTED JUNE 2, 1903.
A. H. GARDE.
TRAY.
APPLICATION FILED MAY 1, 1902.
NO MODEL.
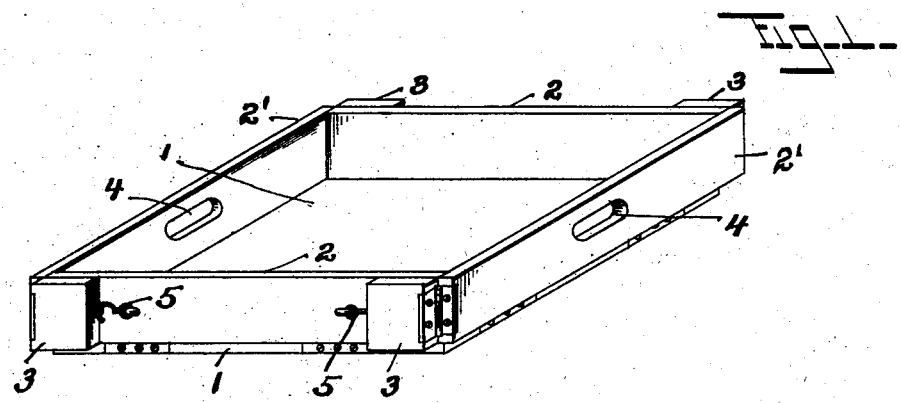
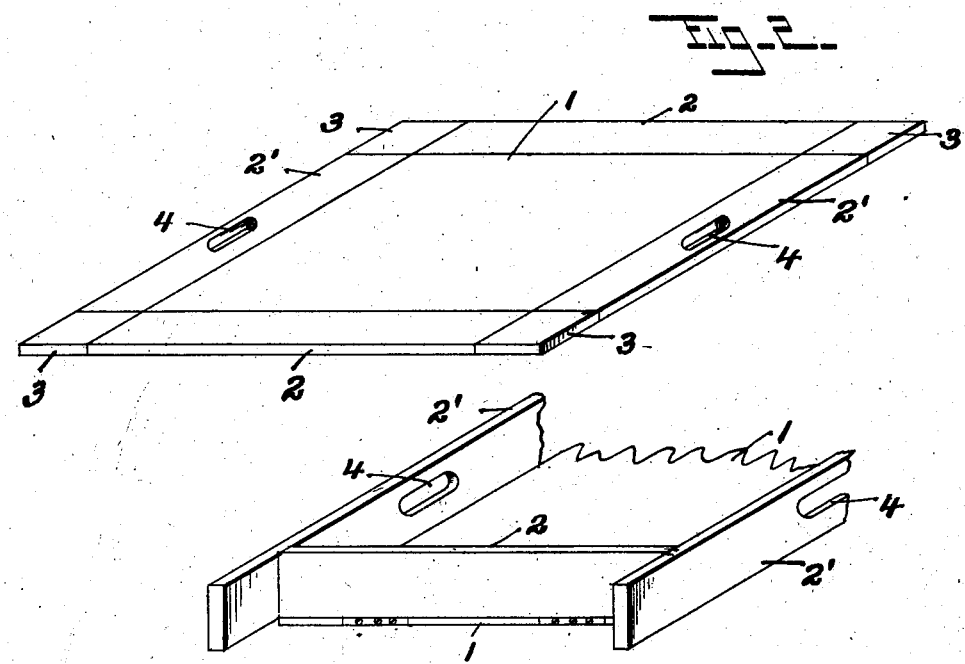
Witnesses.
J. P. Dyson
William O'Brien
Inventor.
Ada H. Garde
by George E. Hall
Attorney.

No. 729,568. Patented June 2, 1903.

UNITED STATES PATENT OFFICE.

ADA H. GARDE, OF NEW HAVEN, CONNECTICUT.

TRAY.

SPECIFICATION forming part of Letters Patent No. 729,568, dated June 2, 1903.

Application filed May 1, 1902. Serial No. 105,531. (No model.)

*To all whom it may concern:*

Be it known that I, ADA H. GARDE, a citizen of the United States, residing at New Haven, in the county of New Haven and State of Connecticut, have invented certain new and useful Improvements in Trays, of which the following is a specification, reference being had therein to the accompanying drawings.

My invention relates to new and useful improvements in trays, and refers more especially to a device which can be used both as a tray and a table; and its object, among other things, is to so construct the device that it may be used as a waiter's tray when the sides are folded and locked together and as a table when the sides are down flat, the whole then forming a single unbroken surface.

To these and other ends my invention consists in the tray having certain details of construction and combination of parts, as will be hereinafter described, and more particularly pointed out in the claim.

Referring to the drawings, in which like numerals of reference designate like parts in the several figures, Figure 1 is a perspective view of the device complete with the parts in the relative positions occupied by them when the device is used as a tray. Fig. 2 is a perspective view of the device with the sides down, so as to form a table; and Fig. 3 is a fragmentary perspective view of a modification of my invention, the corner-pieces being integral instead of hinged.

In carrying out my invention I provide a base portion 1, and hinged to each of the four edges thereof are the side pieces 2 2', and hinged to the opposite ends of the sides 2' are the corner-pieces 3. Any of the well-known forms of mechanisms for movably securing one part to another can be used instead of the hinges shown in the drawings.

It will be observed from Fig. 2 that when the side and corner pieces are down they form an extension to the base portion 1, the whole then forming a flat level surface which can be used as a table. The device is transformed into a tray by folding the side pieces to the position shown in Fig. 1 and the corner-pieces 3 around the side pieces 2, fastening the whole together by the hooks 5.

For convenience in carrying the tray the hand-holes 4 are provided in the sides 2'.

Either of the side pieces can be extended beyond the remaining side pieces a sufficient distance to provide integral corner-pieces, as illustrated in Fig. 3, instead of having them hinged, as shown in Figs. 1 and 2.

This device is especially designed to be used in hotels, restaurants, &c., where the guests desire meals served in their own rooms or apartments. The waiter in the kitchen arranges the device as a tray and places a table-cover therein with the edges overhanging the said side pieces, after which the dishes containing the food are placed on that part of the table-cover resting upon the base portion 1. The tray is now carried to the room and placed upon any convenient support therein, the sides thrown down to the position shown in Fig. 2, the table-cover straightened out, and the table, with the food thereon, is set for the guest without further ceremony or delay. After the meal is finished the waiter again folds the sides without disturbing the dishes, and the tray, with its contents, is readily removed. It is apparent that during transit none of the contents of the tray can fall off and be broken.

If desired, any of the many forms of folding legs can be attached to the under side of the base portion 1 to form a support.

There are many minor changes and alterations that can be made within my invention aside from those herein shown and suggested, and I would therefore have it understood that I do not limit myself to the exact construction herein shown and described, but claim all that falls fairly within the spirit and scope of my invention.

What I claim as new, and desire to secure by Letters Patent, is—

A tray having a base member; side members hinged to each side of said base member, which form an extension thereof upon each side when in their down position equal to the height of said side members; and corner-pieces hinged to said side members which close the open spaces between the ends of said side members, the said base, side and corner members forming, when in their open position, a flat rectangular tray, substantially as described.

In testimony whereof I affix my signature in presence of two witnesses.

ADA H. GARDE.

Witnesses:
GEORGE E. HALL,
J. PETER DEJON.